US007819020B2

(12) United States Patent
Jacobi et al.

(10) Patent No.: US 7,819,020 B2
(45) Date of Patent: Oct. 26, 2010

(54) INTEGRAL FLOWMETER AND VALVE ASSEMBLY

(75) Inventors: Detlef Jacobi, Bühlertal (DE); Stephan Neuburger, Stadecken-Elsheim (DE); Udo Stevens, Krefeld (DE)

(73) Assignee: Krohne AG, Basel (CH)

( * ) Notice: Subject to any disclaimer, the term of this patent is extended or adjusted under 35 U.S.C. 154(b) by 12 days.

(21) Appl. No.: 11/862,737

(22) Filed: Sep. 27, 2007

(65) Prior Publication Data

US 2008/0087100 A1 Apr. 17, 2008

(30) Foreign Application Priority Data

Sep. 27, 2006 (DE) ...................... 10 2006 045 976

(51) Int. Cl.
*G01F 1/58* (2006.01)

(52) U.S. Cl. .................................................. 73/861.12

(58) Field of Classification Search ....................... None
See application file for complete search history.

(56) References Cited

U.S. PATENT DOCUMENTS 3,795,144 A * 3/1974 Marchesi ..................... 73/201
3,856,033 A * 12/1974 Strain et al. .................... 137/3
3,962,089 A * 6/1976 Fulukawa ................... 210/191
4,055,496 A * 10/1977 Friedrich et al. .............. 210/87
4,198,225 A * 4/1980 Patrick et al. .................. 65/43
4,805,862 A * 2/1989 Wissman ................. 248/229.1
4,986,445 A * 1/1991 Young et al. .................. 222/71
5,085,076 A * 2/1992 Engelmann .................. 73/197
5,381,926 A 1/1995 Credle, Jr. et al.
5,567,875 A * 10/1996 Adams ........................ 73/201
5,878,765 A * 3/1999 Lange .......................... 137/1
6,321,766 B1 11/2001 Nathenson
6,792,799 B2 * 9/2004 Ford ............................ 73/202
7,152,621 B1 * 12/2006 Huetinck .................... 137/385
2003/0192377 A1 * 10/2003 Ford ............................ 73/202
2005/0155644 A1 * 7/2005 Woollums ...................... 137/3
2005/0256428 A1 11/2005 Aundal
2005/0262804 A1 12/2005 Clusserath et al.
2005/0268969 A1 * 12/2005 Zakai et al. ................. 137/540
2008/0012290 A1 * 1/2008 Hamada .................. 285/124.5
2008/0047975 A1 * 2/2008 Hakansson et al. ............ 222/72

FOREIGN PATENT DOCUMENTS

DE 199 13 685 A1 9/2000
DE 10 2004 028 576 A1 12/2005
FR 2487944 2/1982
GB 1424875 A 2/1976
KR 562770 * 3/2006
KR 755297 * 9/2007
WO WO 00/50793 8/2000
WO WO 01/55627 A1 8/2001

* cited by examiner

*Primary Examiner*—Harshad Patel
(74) *Attorney, Agent, or Firm*—Cesari and McKenna, LLP

(57) ABSTRACT

A flowmeter, in particular a magnetoinductive flowmeter, for measuring the flow rate of a moving medium has a measuring tube through which the medium is channeled and a flow-measuring device is positioned within the measuring tube. A valve housing is provided that is produced jointly with the measuring tube as a one-piece unit, the result being a compact flowmeter that easily meets hygienic standards.

6 Claims, 3 Drawing Sheets

INTEGRAL FLOWMETER AND VALVE ASSEMBLY

The invention relates to a flowmeter for measuring the flow rate of a moving medium, in particular a magnetoinductive flowmeter, with a measuring tube through which the medium is channeled and with a flow-measuring device positioned within the measuring tube.

BACKGROUND OF THE INVENTION

Flowmeters such as magnetoinductive flowmeters have been well-known for a long time and are widely employed in a variety of applications. Magnetoinductive flowmeters in particular are used in volumetric filling and metering processes, meaning that magnetoinductive flowmeters are used in conjunction with filling machines for bottling or otherwise packaging liquid foods such as beverages.

The underlying concept of a magnetoinductive flowmeter for flowing media goes all the way back to Faraday who in 1832 suggested using the principle of electromagnetic induction for flow-rate measurements. According to Faraday's law of induction, a flowing medium that contains charge carriers and travels through a magnetic field will generate an electric field intensity perpendicular to the flow direction and to the magnetic field. A magnetoinductive flowmeter utilizes Faraday's law of induction in that a field coil generates a magnetic field with a magnetic field component that extends in a direction perpendicular to the flow path. Within that magnetic field, each volume element of the flowing medium traveling through the magnetic field and containing a certain number of charge carriers contributes the field intensity produced in that volume element to a measuring voltage that can be collected via measuring electrodes.

In conventional magnetoinductive flowmeters, the measuring electrodes are designed either for conductive or for capacitive coupling with the flowing medium. One salient feature of magnetoinductive flowmeters is the proportionality between the measured voltage and the flow rate of the medium averaged across the diameter of the measuring tube, i.e. between the measured voltage and the volume flow.

In the area of the measuring electrodes at a minimum, the interior of the measuring tube must be electrically insulating or lined with an electrically insulating material. In particular, the measuring tube may be produced from a ceramic material in which the measuring electrodes are embedded for instance by a sintering process.

The use of a magnetoinductive flowmeter with a filling machine serving for the bottling or canning of liquid foods is contingent on two prerequisites of great significance: First, hygienic requirements must be met, meaning that the conduits and couplings as well as the junctions between the individual components must be in compliance with hygienic standards. Second, a magnetoinductive flowmeter intended for use with a filling machine must be sufficiently compact, allowing the filling machine to be equipped in space-saving fashion with a large number of these magnetoinductive flowmeters.

SUMMARY OF THE INVENTION

Against the above background, it is the objective of this invention to introduce a flowmeter and in particular a magnetoinductive flowmeter that is compact and designed to easily meet the hygienic standards established for filling machines.

Based on the concept of a flowmeter as described above, this objective is achieved by incorporating a valve housing that is integrated in unitary fashion into the measuring tube.

A key component of a filling machine is usually a valve that is controlled in a manner whereby a predefined, flowmeter-determined quantity of a medium is precisely metered into a container that is to be filled. In that context, the invention provides for the measuring tube of the flowmeter to be pre-equipped with an integrated valve housing, so that the measuring tube and the valve constitute a single, unitary module. The result is a compact design that saves space and is easy to manipulate, and in the absence of a transitional interface between the measuring tube and the valve housing, simple operation is assured from the hygienic point of view as well.

There are essentially many ways in which the valve-housing and measuring-tube combination can be designed as a single unit. According to one preferred embodiment of the invention, however, the valve housing is integrated directly into the measuring tube, for instance molded to it. According to an alternative preferred embodiment of the invention, the valve housing and the measuring tube are produced from a common blank. In a particularly preferred implementation of the invention that lends itself especially well to magnetoinductive flowmeters, the measuring tube and the valve housing are produced from a ceramic material, specifically from a single ceramic blank.

When the measuring tube and the valve housing are produced from a ceramic material, a preferred embodiment according to the invention provides for the valve housing to accommodate a moving valve element which, as well, consists of a ceramic material, especially and preferably of the same ceramic material as the valve housing and the measuring tube. Moreover, in a preferred embodiment of the invention there is no separate gasket interpositioned between the valve housing and the valve element. Instead, the two ceramic surfaces, i.e. that of the valve housing and that of the valve element, are in flush contact so that due to their attainable extreme smoothness, an adequate sealing effect is obtained without a separate gasket.

There are several options for positioning the valve housing. However, in a preferred embodiment of the invention the valve housing is positioned downstream from the flow-measuring device.

The following will explain this invention in more detail with the aid of the preferred implementation examples and with reference to the attached drawings.

DETAILED DESCRIPTION OF ILLUSTRATIVE EMBODIMENTS

Figure 1:
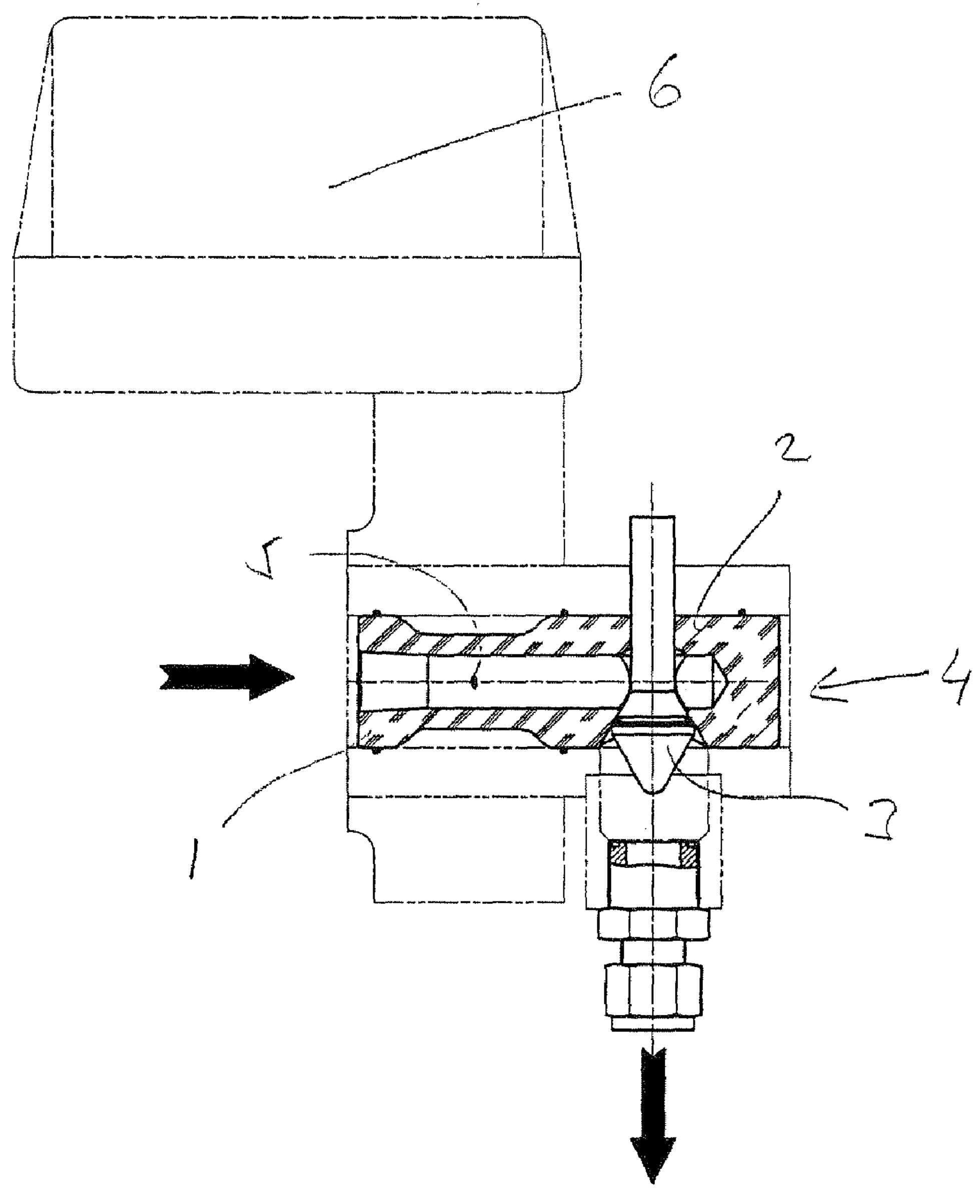
FIG. 1 is a partly cross-sectional illustration of a magnetoinductive flowmeter according to a first embodiment of the invention.

The magnetoinductive flowmeter shown in FIG. 1, representing a first preferred embodiment of the invention, encompasses a ceramic measuring tube 1 whose right end features an integral valve housing 2. The valve housing encloses a moving valve element 3 that can be controlled in a manner whereby the valve 4, composed of the valve housing 2 and the valve element 3, can be opened and closed. The measuring tube 1 and the valve housing 2 have been produced from a single ceramic blank, the result being a unitary one-piece design in which the measuring tube 1 seamlessly transitions into the valve housing 2.

As constituent components of a flow-measuring device positioned within the measuring tube 1, measuring electrodes 5, sintered into the measuring tube 1, extend into the interior of the measuring tube 1 which allows them to be in electrically conductive contact with the medium flowing through the measuring tube 1. With the bold arrows indicating the direction of flow, it can be seen that the valve 4 is positioned downstream from the flow-measuring device.

The measuring signal collected via the measuring electrodes 5, that being the voltage induced in the flowing medium, is fed to a conventional measuring electronics unit 6, contents not illustrated, which as a function of the suitably preselected setpoint parameters controls the valve 4 for metering out the volume units of the flowing medium required for the filling process.

Figure 2:
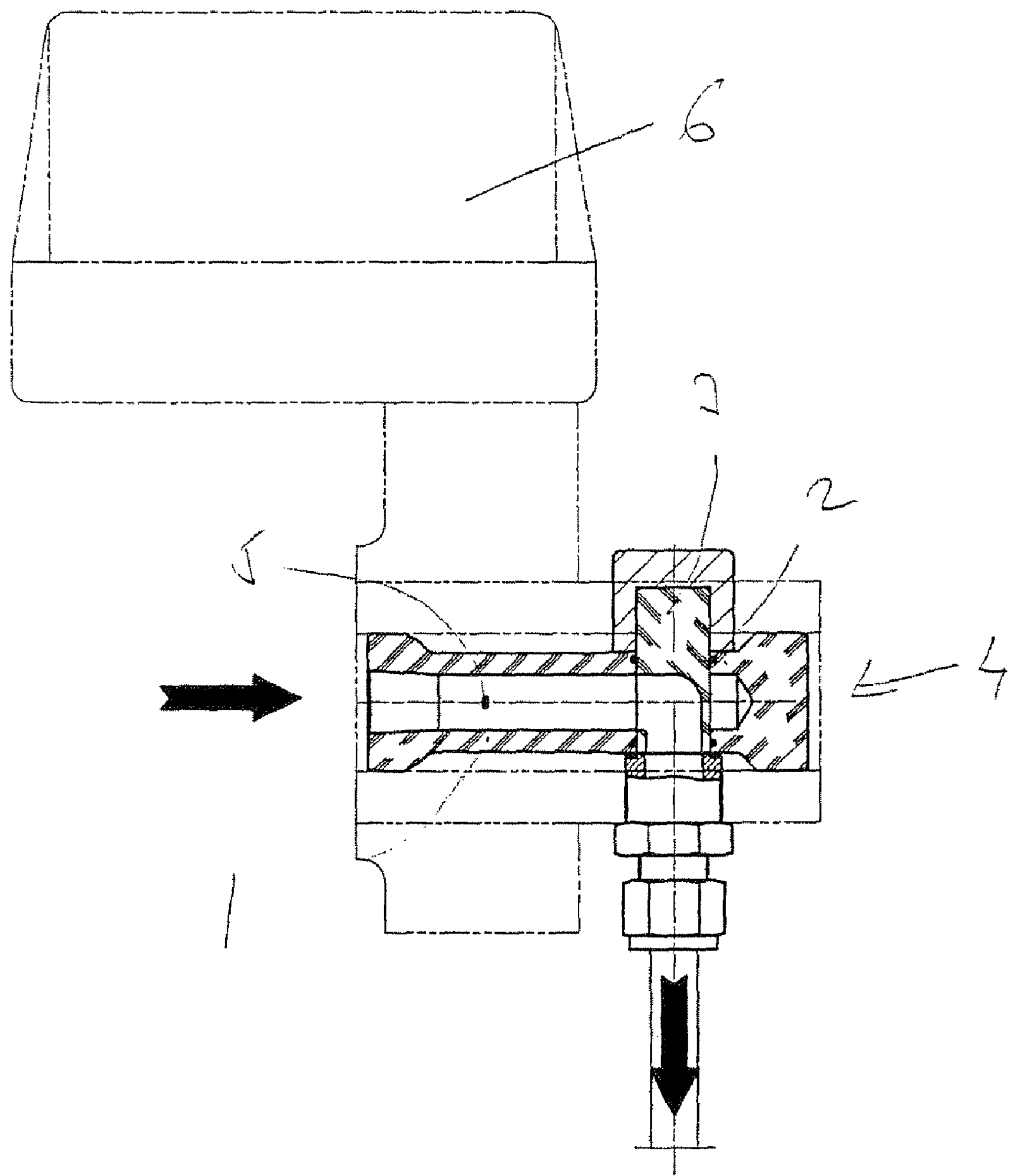
FIG. 2 is a partly cross-sectional illustration of a magnetoinductive flowmeter according to a second embodiment of the invention.
Figure 3:
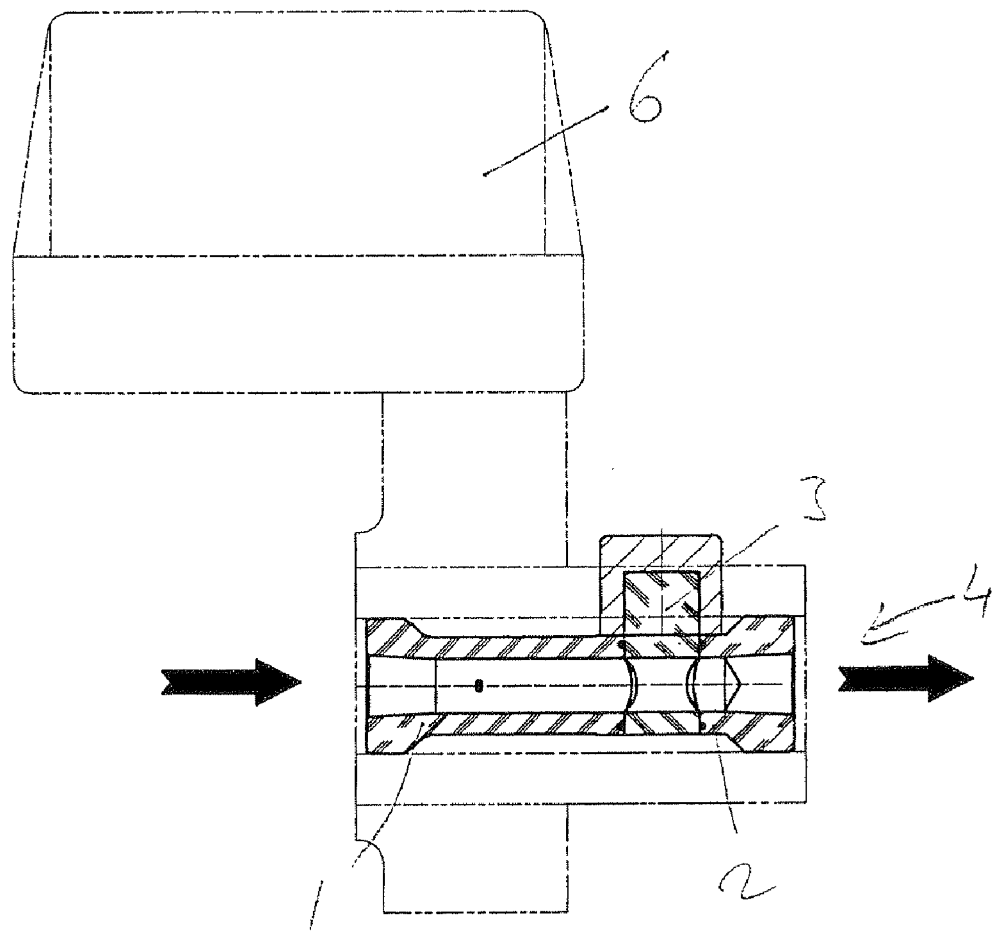
FIG. 3 is an illustration, again partly cross-sectional, of a magnetoinductive flowmeter according to a third embodiment of the invention.

In the first preferred embodiment described above, the direction of flow through the measuring tube 1 is horizontal and, after its flow rate has been measured, the medium passes through the valve 4, at a right angle to it i.e. downward, for the filling process. The magnetoinductive flowmeter illustrated in FIG. 2, representing a second preferred embodiment of the invention, is configured in analogous fashion except that, while in the first preferred embodiment of the invention, the valve element 3 moves up and down in the dispensing direction, the valve element 3 in the second preferred embodiment of the invention is of the rotary type. As can be seen in FIG. 3 illustrating a third preferred embodiment of the invention, a rotary valve element therein is so configured that the medium is dispensed through the valve 4 in the same direction in which it flows through the measuring tube 1.

What is claimed is:

1. A magnetoinductive flowmeter for use in conjunction with filling and metering apparatus to measure the flow rate of a moving medium, comprising a measuring tube through which the medium is channeled, a flow-measuring device positioned within the measuring tube and a valve housing integrated into the measuring tube so as to form a single unit therewith, said valve housing being positioned downstream from the flow-measuring device as viewed in the flow direction and containing a movable valve member that is controllable so that the valve housing and valve member form a valve that can be opened and closed to precisely meter a predetermined flowmeter-defined quantity of the medium from said apparatus into a container to be filled.

2. The flowmeter as in claim 1, wherein the valve housing and the measuring tube stem from one common blank.

3. The flowmeter as in claim 1 or 2, wherein the measuring tube and the valve housing are of a ceramic material.

4. The flowmeter as in claim 3, wherein the valve housing contains a moving valve element which is of a ceramic material.

5. The flowmeter as in claim 4, wherein the boundary between the valve housing and the valve element is devoid of a gasket.

6. The flowmeter as in claim 1, wherein the flow-measuring device includes a pair of measuring electrodes positioned within the measuring tube.

* * * * *